United States Patent [19]

Littwin

[11] 3,949,288
[45] Apr. 6, 1976

[54] MOVEMENT CONTROL

[76] Inventor: Arthur K. Littwin, 6555 N. Le Mai, Lincolnwood, Ill. 62656

[22] Filed: Aug. 18, 1967

[21] Appl. No.: 661,571

[52] U.S. Cl. ............... 318/127; 318/286; 318/466
[51] Int. Cl.² ................... H01H 47/24; H02P 1/00
[58] Field of Search ............. 318/127, 286, 466, 28

[56] References Cited
UNITED STATES PATENTS

| | | | |
|---|---|---|---|
| 2,674,706 | 4/1954 | Knosp | 318/286 |
| 2,714,906 | 8/1955 | Peterson | 318/466 |
| 2,747,150 | 5/1956 | Selby | 318/286 |
| 2,776,396 | 1/1957 | Gille | 318/28 |
| 2,794,162 | 5/1957 | Lifsey | 318/286 |
| 3,045,165 | 7/1962 | Littwin | 318/286 |
| 3,213,342 | 10/1965 | Littwin | 318/286 |

*Primary Examiner*—O. L. Rader
*Assistant Examiner*—K. L. Crosson

[57] ABSTRACT

Controlling movements of reciprocating table by switching means positioned at limit in each direction; includes plurality of pairs of such switching means, selectively presettable in programming arrangement for automatic control, with means for selective changing between automatic and manual control; also includes low amperage control circuit for controlling high amperage circuit which directly controls the reciprocating table.

9 Claims, 7 Drawing Figures

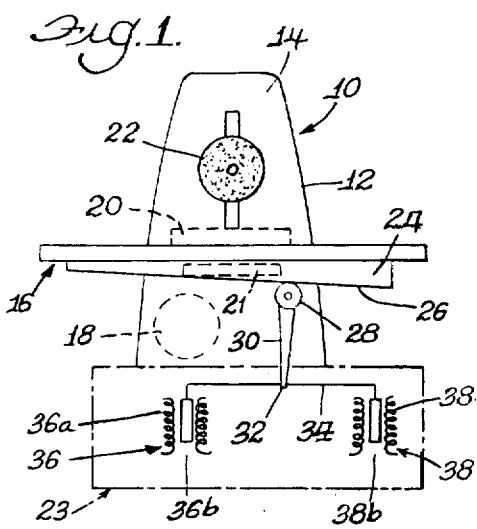
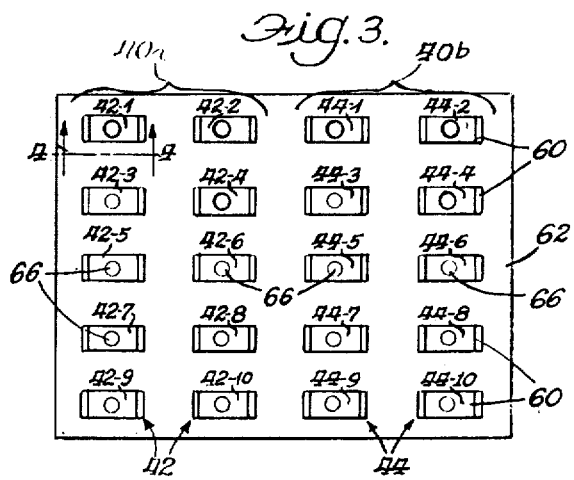
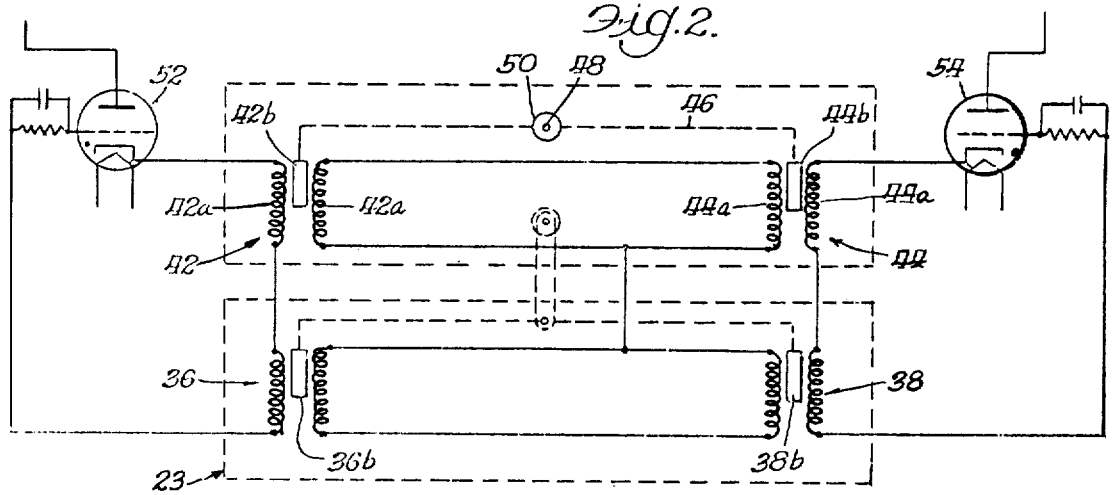
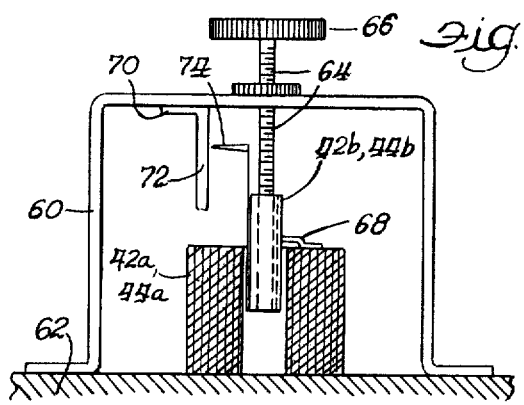
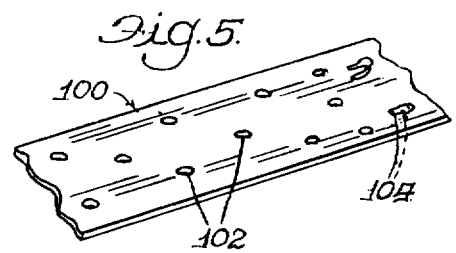

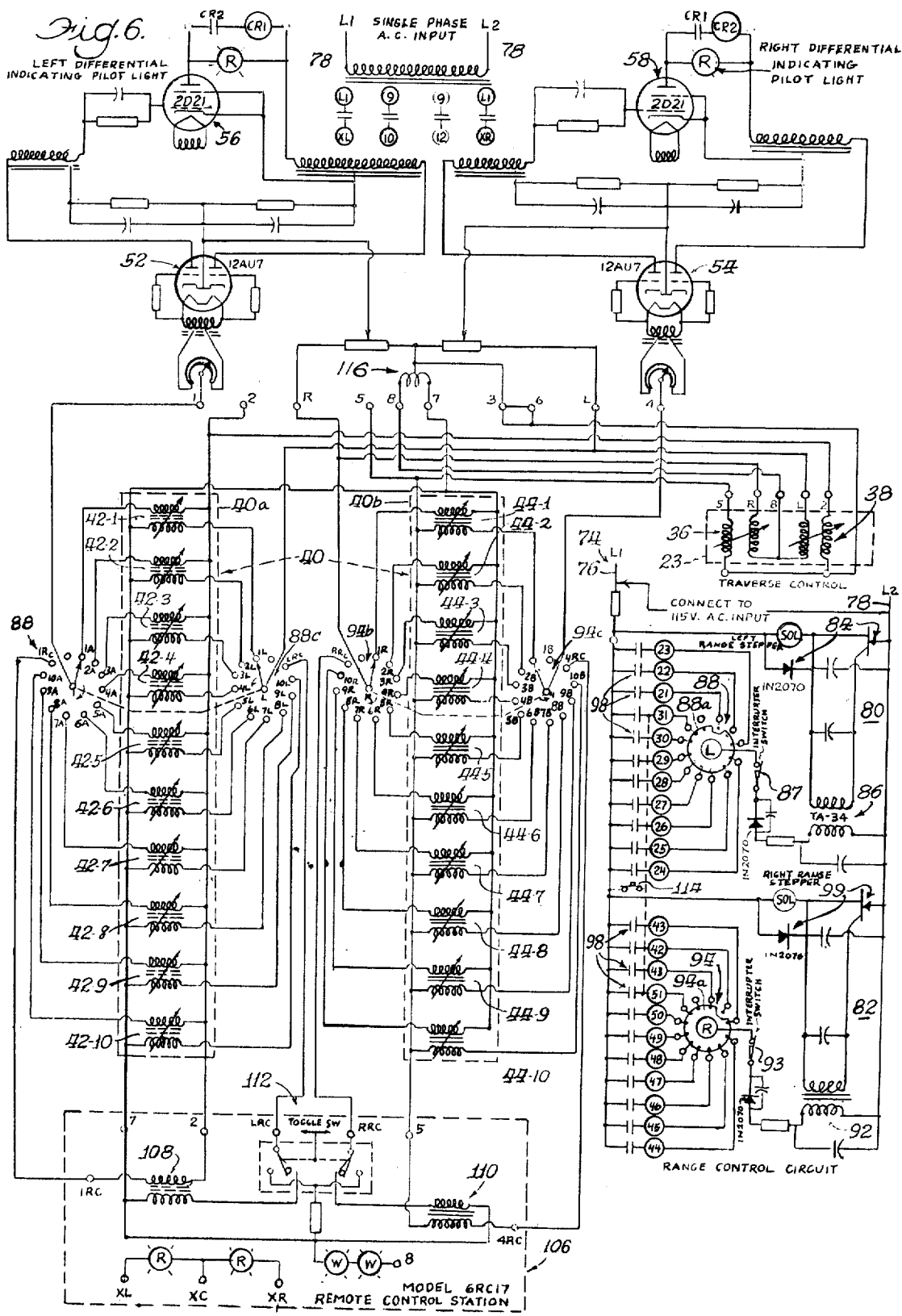

3,949,288

MOVEMENT CONTROL

CROSS REFERENCES

Littwin U.S. Pat No. 3,045,165, dated July 17, 1962;
Littwin U.S. Pat. No. 3,213,342, dated Oct. 19, 1965;
Littwin co-pending application, Ser. No. 455,564, filed May 13, 1965, abandoned in favor of continuation-in-part application, Ser. No. 779,103, filed Nov. 26, 1968.

OBJECTS OF THE INVENTION

An object of the invention is to provide novel automatic control of a reciprocating member with a wide variety of selectable limit positions.

Another object is to provide a control of the foregoing character which is particularly adapted to selective presetting for automatic programming control.

A further object is to provide a control of the character just previously referred to which is particularly adapted to incorporation in a presettable programming arrangement which may also include other kinds of operations.

An additional object is to provide a control of the foregoing general character with novel means for changing between automatic and manual control.

Still another object is to provide apparatus of the foregoing general character having a novel control incorporating a low amperage control circuit for controlling a high amperage circuit which directly controls the reciprocating member.

A still further object is to provide a novel method of carrying out control operations which apparatus of the foregoing character is capable of performing.

DESCRIPTION OF A PREFERRED EMBODIMENT OF THE INVENTION

FIG. 1 is a semi-diagrammatic illustration of a machine tool of a type to which the apparatus of the present invention is particularly adapted;

FIG. 2 is a diagram of certain electrical circuit portions utilized in the apparatus;

FIG. 3 is a plan view of a bank of control elements utilized in the electrical circuit;

FIG. 4 is a large scale view of one of the control elements of FIG. 3, being taken on line 4—4 of the latter figure;

FIG. 5 is a fragmentary view of a control tape;

FIG. 6 is a diagram of the main electrical circuit of the apparatus; and

Figure 7:
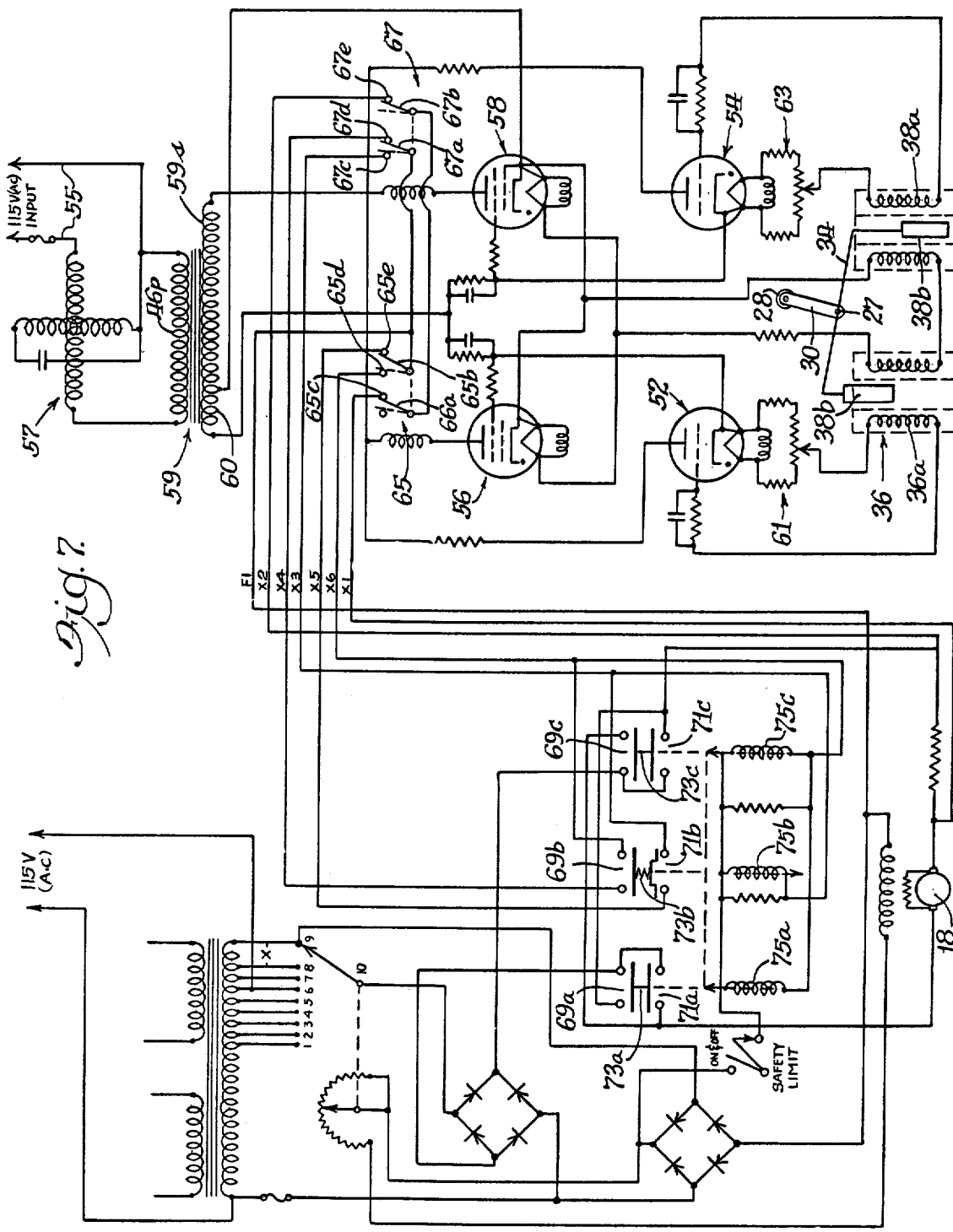

FIG. 7 is a diagram of an electrical circuit incorporated in the machine as disclosed in my U.S. Pat. No. 3,213,342 referred to above.

Detail reference is now made to the accompanying drawings, where in FIG. 1 a machine tool 10 is shown which in the present instance may be a grinder, representative of the various devices to which the invention is applicable. The machine tool or grinder 10 includes a base for frame 12 having an upstanding portion 14 and a table 16 which is reversibly movable laterally as viewed in that figure and driven by suitable means such as an electric motor 18. A workpiece 20 is put on the table and held in place by suitable means such as a magnetic chuck indicated diagrammatically at 21. A grinding wheel 22 is incorporated in the machine and movable vertically into and out of grinding engagement with the workpiece. As the table is moved in reversing directions, and the grinding wheel brought into engagement with the workpiece, the desired grinding operation is performed. The foregoing arrangement is known.

Also included in the machine represented in FIG. 1 is a means for controlling the movements of the table 16, and particularly adjustably limiting its range of movement in each direction. Such control means is disclosed and claimed in my prior U.S. Pat. No. 3,045,165 referred to above. This control means indicated generally at 23, includes a "taper bar" 24 having an inclined surface 26 against which bears a roller 28 on a swinging arm 30 secured to a beam 34 pivoted at 32. Associated with the ends of the beam 34 are induction coil means 36 and 38 having coils 36a, 38a and armatures 36b and 38b, the armatures being pivotally mounted on the ends of the beam.

Upon movement of the table 16 in reversing directions, the arm 30, under the action of the inclined surface 26, is rocked and it rocks the beam 34 correspondingly, moving the armatures 38a and 38b into and out of the coils with controlling effect as described and claimed in my prior U.S. Pat. No. 3,045,165, and as referred to again hereinbelow.

FIG. 2 shows a control arrangement which is also shown in FIG. 8 of the prior patent just referred to. The control means designated 23 in FIG. 1 herein is also shown in this figure and associated with it is a "remote control" 40 which includes induction coil means 42 and 44 associated with the induction coil means 36 and 38 respectively. The present induction coil means include coils 42a and 44a, and armatures 42b and 44b. These armatures are mounted on the ends of a rockable beam 46 pivoted at 48 connected with a manually operable and settable control knob indicated generally at 50. Associated with the induction coil means 42 and 44 are tubes 52 and 54.

While the operation of the foregoing is described in full in my prior U.S. Pat. No. 3,045,165, a brief resume of that operation is set out here in connection with FIG. 7 herein, which are made up of FIGS. 3 and 4 of that patent, being identical therewith except for different reference numerals. This figure shows, at lower right, the beam 34 and lever 30 and the induction coil means 36, 38, as well as the tubes 52, 54 and 56, 58 identified above. Additionally the circuit includes the motor 18 (lower left). Upon movement of the table 16, and consequent swinging of the arm 30 and beam 32, the armatures 36b and 38b move relatively into and out of the associated coils, setting up an inductance control through the tubes 52, 54 and producing a reversing effect on the motor 18 driving the table. The positions of the armatures 42b, 44b, relative to their entrance into the coils, produce an additive or counteracting effect on the coil means 36, 38 and thereby control the reversing operation of the driving motor 18 at different positions of the table 16 relative to its maximum range of movement. Preferably the beam 46 is made of two parts, each pivoted at 48 and each provided with a separate control knob 50 so as to selectively and independently position the armatures 42b, 44b, and correspondingly control the limits of the range of movement of the table in corresponding directions.

The circuit of FIG. 7 includes a power line 55 in which is connected a constant voltage transformer 57; another transformer 59 has a secondary winding 59s arranged for providing suitable voltage on the windings 36a, 38a of the transformers 36, 38. The secondary windings of these transformers respectively are connected through potentiometer means 61, 63 with the tube means 52, 54 in suitable circuit for imposing bias on the tube means in accordance with variations in the transformers produced by the cores 36b, 38b. The tube means 52, 54 are normally non-conducting and become conducting upon being fired in response to imposition of the necessary voltage thereon as controlled by the armatures 36*b*, 38*b*, and they control the second tube means 56, 58. When the tube means 56 becomes conducting, it actuates a relay 65 and in a similar manner in connection with the tube means 54, 58, a similar relay 67 becomes conducting.

The relay 65 includes switch blades 65*a*, 65*b*, and contacts 65*c*, 65*d*, 65*e*, and similarly the relay 67 has corresponding elements with the same reference numerals and subscripts. The relays 65, 67, are illustrated in deenergized conditions or positions and the positions they assume in normal operation of the device except momentarily at each end of the movement of the reciprocating table when they are energized; in the latter condition, they assume the dotted line positions.

The control functions exercised by the right hand portion of the circuit of FIG. 7 are exerted on the left hand portion thereof in a matter that is believed apparent from the diagram and the following description; contacts 69*a*, 69*b*, 69*c* are associated respectively with contacts 71*a*, 71*b* and 71*c* and associated with these two groups of contacts are additional contacts 73*a*, 73*b*, 73*c*. The sets of contacts are arranged for actuation respectively by electromagnets 75*a*, 75*b*, 75*c*.

The main circuit of the apparatus, shown in FIG. 6, includes the control components described above, together with modifications and amplifications thereof. The control unit 23 is shown in FIG. 6 at right center, the induction coil means being shown conventionally. The secondary control means 40 is also shown in FIG. 6, at lower left, but in this case instead of including only two induction coil means there are twenty, arranged in two groups, 40*a* and 40*b*, each including ten. The induction coils in FIG. 6 are individually identified 42-1, 42-2, etc. to 42-10 on the one side and 44-1 and 44-2, etc. to 44-10 on the other side. In this case also the induction coil means are represented conventionally.

The tubes 52 and 54 are also incorporated in the circuit of FIG. 6 as are the additional tubes 56 and 58. As noted above the control of the limits of the range of movement of the table is established through positioning or setting of the armatures 42*b*, 44*b*, in their respective coils. While in the prior patent just referred to, these armatures are set by manual manipulations, effective settings in the present instance are accomplished by selection of different ones of induction coil means which have been individually preset. These induction coil means are shown in detail in FIGS. 3 and 4. FIG. 3 is a plan view showing twenty induction coil units, indicated in the groups 40*a*, 40*b* and individually identified 42-1, 42-3, etc. and 44-1, 44-2, etc. These units are all identical in construction and as shown in FIG. 4 each includes a U-shape body or frame 60 mounted on a panel 62. Each unit includes a coil 42*a* (44*a*) and an armature 42*b* (44*b*). The armature extends into the coil and is arranged for vertical adjustment by means of a screw shank 64 threaded in the armature and rotatably mounted in the frame 60 against axial movement and having a hand operated knob 66. A clip 68 mounted on a fixed element prevents the armature from rotating. A scale member 70 is mounted on a fixed portion of the unit and is provided with a scale 72 with which cooperates a pointer 74 on the armature for visually indicating the exact position of the armature relative to the coil.

Each unit 60 is individually preset, by adjusting the knob 66 and correspondingly adjusting the armature to the desired position relative to the coil. This adjustment is equivalent to the adjustment, in FIG. 2, of each of the armatures 42*b*, 44*b*, by the knobs 50. This position of the armature determines the limit of movement of the table in the corresponding direction as referred to again hereinbelow.

The automatic control is derived through the subbircuit indicated in its entirety at 74 at the lower right of FIG. 6. This subcircuit includes main lines 76, 78 leading from a suitable AC source, a first portion 80 relating to the "left" side and another portion 82 relating to the "right" side of the reciprocating operation of the table. These two portions are substantially identical in content. In the portion 80 are back-to-back rectifier means 84 leading to a step-down transformer 86 providing low amperage D.C. through an interrupter switch 87 to a stepping switch means of known kind indicated generally at 88. This stepping switch means includes a component 88*a* in the circuit portion 80 and relay components 88*b* and 88*c*, all three components being secured to a single shaft. The component 88*b* has contacts leading to one side of each induction coil means 42-1, 42-2, etc; the other switch component 88*c* has contacts leading to the other side of each induction coil 42-1, 42-2, etc.

The other circuit portion 82 (lower right) includes back-to-back rectifier means 90 and a step-down transformer 92 providing low amperage D.C. leading through an interrupter switch 93 to a stepping switch means 94 of known kind which, similarly to the switch means 88, includes a first stepping component 94*a* and relay components 94*b* and 94*c*. The component 94*b* has contacts connected with one side of each of the induction coil means 44-1, 44-2, etc. while the other component 94*c* has contacts connected with the other sides of the same induction coil means 44-1, 44-2, etc.

The circuit portion 80 includes a bank of sets (11) of contacts 96 individually identified 96-1, 96-2, etc. and individually associated with the contacts in the switching component 88, while the other circuit portion 82 includes a bank of sets (11) of contacts 98 individually identified 98-1, 98-2, etc. and individually associated with the switch contacts of the component 94*a*. These contacts 96, 98 are actuated by the automatic control means which preferably includes a perforated tape 100, as shown in FIG. 5. This tape and the associated control means are of known type. The tape includes for example perforations 102 arranged at various positions and as the tape moves along its path, electrical contact, or other control relationship, is established by means of the positioning of the apertures, such as contact engagement between contact elements 104 on opposite sides of the tape. The perforations include suitable ones for controlling various operations including for example the movement of the grinding wheel 22 (FIG. 1), lathe operations, and any of a wide variety of other operations. The tape also includes control perforations for starting and stopping etc. Among the control operations controlled by the tape is a closure of the contact elements 96, 98 in the subcircuit at the lower right of FIG. 6. Among the operating steps controlled by the tape, in certain positions of the tape, is the closure of one each of the banks of contacts 96, 98. When any one of the sets of the contacts 96 is closed, the switching component 88*a* is advanced to a predetermined position according to that set. This advances the relay components 88b, 88c so that the wiper arms engage those contacts relating to the corresponding induction coil means 42. A similar operation occurs upon the closure of any of the sets of contacts 98, the switching means 94 advancing to the position according to that set, thereby placing in circuit the corresponding one of the induction coil means 44. It will be understood that only one of the induction coil means 42, and one induction coil means 44, are put in circuit or energized at any one time.

Upon energization of one coil means 42 at one side and one coil means 44 at the other side, the circuit of FIG. 6 is rendered operative and the table of the grinding machine is reciprocated within the limits determined by the particular induction coil means energized and utilized in the particular programming operation.

Each of the induction coil units 40 of FIGS. 3 and 4 is set in a predetermined position, manually and according the programming operation to be performed on the workpiece. For example assume that the workpiece is such, and the various operations to be performed thereon are such, that at one stage in the operation it is desired that the table move 12 inches to the left and 15 inches to the right; one of the units 42 on the left side, for example 42-1, is set so that the armature 42b thereof is properly positioned within the coil so that the table moves the desired distance, i.e., 12 inches to the left, and then the reversing operation takes place on the drive motor 18; another unit on the right side, for example the first one, 44-1, is set so that the armature 44b thereof is properly positioned within its coil so that the reversing operation on the table takes place at 15 inches to the right. Then the tape 100 is provided with perforations so located that when the machine is at the desired position for this operation to take place, according to another condition perforation in the tape, they effect closing of the contact elements 96, 98, such for example as 96-1, 98-1, corresponding to the induction coil units 42-1, and 44-1, the latter being thereby energized. Then at another step in the overall operation on the workpiece it may be desired that the table move between 30 inches for example to the left and 60 inches to the right; in such case another one of the induction coil units on the left, for example the second one 42-2, is set at a 30-inch position and another unit 44 on the other side, for example 44-2, is set at a 60-inch position on the right. These units would be energized as by the contacts 96-2, 98-2, for example. This then enables the table to move within the longer range from 30 inches on the left to 60 inches on the right.

The example here disclosed includes 10 units for each side of the range of movement of the table and by complete permutation these allow for as many as 100 different combinations or ranges of movement of the table. It is not essential that there be just 10 such units on each side, but there may be more or less than that number.

My co-pending application identified above includes a plurality of serially operating stages each including induction coil means for controlling the operation on the workpiece, but it does not include an arrangement for preselecting as in a programming operation.

The circuit includes convenient means for changing between automatic and manual control. A manual control arrangement is indicated in its entirety at 106 (bottom left) and includes induction coil means 108 and 110 corresponding in operation with the coil means 42 and 44 respectively. The coil means 108, 110 are associated with toggle switch means 112 effective for switching the circuit for reversing the table 16. The stepping switch means 88, 94 are preferably arranged for quickly setting the circuit into manual control; for example a pushbuttom 114 (lower right) may be provided for closing desired ones of the contacts 96, 98 which moves the stepping switches 88, 94 into manual-control position, and upon the circuit being moved into such position the manual control circuit 106 (bottom left) comes into effect.

The subcircuit 74 provides a substantial advantage in the low amperage current delivered to the stepping stages 88a, 94a of the stepping switches, through the contacts 96, 98. Other portions of the circuit require relatively high amperage currents for effective and practical operation, but such higher amperages are higher than desired for certain components thereof. In the present instance the step-down transformer means 86, 92 provide the desired lower amperage current flowing through the contacts 96, 98 so that these contacts can be used indefinitely without fear of burning or fusing or other unusual deterioration.

The circuit (FIG. 6) preferably also includes means for automatically compensating for drifting effect due to uneven heating of the tubes, as well as other and related features as represented by a center-tap transformer means here shown at 116; this feature is disclosed and claimed in my U.S. Pat. No. 3,213,342, referred to above.

What is claimed is:

1. In combination, a reciprocably movable member having a predetermined maximum range of movement, induction responsive reversal means for reciprocably driving the movable member, an induction device associated with each direction of movement of the movable member, and the movable member being operable for producing induction in the induction devices in the respective directions of movement, a group of induction control units associated with each induction device, circuit means for establishing connection between the induction control unit in each group with the associated induction device, and each when so connected being operative for opposing the induction produced in the associated control device and thereby effecting reversal of the driving means, the induction control units being individually pre-settable to adjustably predetermine the extent of opposition to the induction whereby to adjustably predetermine the position of the movable member relative to its said range of movement at which the driving means is reversed, and programming means operable in response to a single program setting for successively connecting the induction control units in the groups with the associated induction devices.

2. A combination according to claim 1 wherein the induction control units are manually pre-settable each independently of all the others and thereby operative for correspondingly determining ranges of movement less than said maximum range, and also operable for determining lesser ranges, of any predetermined extent, at different positions throughout said maximum range.

3. A combination according to claim 1 and including circuit means operatively connected between the programming means in the induction control units, whereby to enable spacing of the programming means and the induction control units and corresponding remote control thereof.

4. A combination according to claim 1 and including circuit means operative for reversing the driving means, the circuit means including switch means, the induction devices being operative for actuating the switch means, and the movable member being operative, in response to its movements, for gradually increasing and decreasing the inductance on the induction devices and thereby actuating the switch means.

5. A combination according to claim 1 wherein the programming means includes a perforated tape, and the combination includes switch means operative for making the contact through perforations in the tape.

6. A combination according to claim 5 and including rotary selective switch means operative for selectively energizing said control elements.

7. A combination according to claim 1 and including means for manually controlling the reversing movements of the movable member, and manually actuatable means for selectively rendering operative the manual control means and the programming means.

8. A combination according to claim 1 and including an electrical circuit, each said induction control unit including an induction means in said circuit, control contacts for energizing each induction means, and transformer means operative for providing low amperage for said control contacts and high amperage for said induction means.

9. A combination according to claim 1 wherein each induction device includes a coil and an armature therein, means for oppositely moving the armatures in the respective coils in response to movements of the movable member in its opposite directions, said induction control units each including a coil and an armature adjustably pre-settable therein, and wherein the combination also includes rotary switch means operatively associated with each group of induction control units and having a set of position contacts controlling a corresponding one of the units in that group, selector contacts associated with each set of position contacts and operative upon actuation thereof for advancing the rotary switch means and energizing the corresponding set of position contacts, and means for actuating the selector contacts.

* * * * *